US012153466B2

(12) United States Patent
Kim

(10) Patent No.: US 12,153,466 B2
(45) Date of Patent: Nov. 26, 2024

(54) SUPPORT MEMBER SUPPORTING SLIDABLE DISPLAY AND ELECTRONIC DEVICE INCLUDING THE SAME

(71) Applicant: Samsung Electronics Co., Ltd., Gyeonggi-do (KR)

(72) Inventor: Jonghae Kim, Gyeonggi-do (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 410 days.

(21) Appl. No.: 17/568,807

(22) Filed: Jan. 5, 2022

(65) Prior Publication Data

US 2023/0011107 A1    Jan. 12, 2023

Related U.S. Application Data

(63) Continuation of application No. PCT/KR2021/015849, filed on Nov. 4, 2021.

(30) Foreign Application Priority Data

Jul. 6, 2021 (KR) .................. 10-2021-0088448

(51) Int. Cl.
*G06F 1/16*    (2006.01)

(52) U.S. Cl.
CPC .......... *G06F 1/1624* (2013.01); *G06F 1/1652* (2013.01)

(58) Field of Classification Search
CPC ......... G06F 1/1624; G06F 1/1652; G06F 1/16
(Continued)

(56) References Cited

U.S. PATENT DOCUMENTS 10,742,784 B1    8/2020  Jo et al.
2010/0276078 A1*  11/2010  Kitada ................ B32B 38/0004
                                                          156/247
(Continued)

FOREIGN PATENT DOCUMENTS

KR    10-2017-0141438 A    12/2017
KR    10-2019-0101605 A     9/2019
(Continued)

OTHER PUBLICATIONS

International Search Report Dated Mar. 25, 2022.

*Primary Examiner* — Timothy J Thompson
*Assistant Examiner* — Guillermo J Egoavil
(74) *Attorney, Agent, or Firm* — Cha & Reiter, LLC

(57) ABSTRACT

According to certain embodiments of the disclosure, an electronic device may include a first housing; a second housing slidably combined with the first housing; a display fixed at least in part to the second housing and having an visible display area increasing or decreasing in response to a sliding of the second housing, wherein the visible display area is a portion viewed from an outside of the electronic device; and a support structure having a bendable structure, supporting at least a portion of the display, and moving in response to the sliding of the second housing, the support structure comprising one or more support members, and guide rail, wherein each one of the one or more the support members include: a base member extending in a first direction perpendicular to a sliding direction of the second housing and arranged along the sliding direction, and connected to the guide rail, wherein the guide rail guides the movement of the base member; a moving member formed in a shape corresponding at least in part to a receiving groove formed in the base member and inserted at least in part into
(Continued)

the receiving groove, and a fixing member fixing the base member and the moving member to the display.

19 Claims, 15 Drawing Sheets

(58) Field of Classification Search
USPC .......................................................... 361/190
See application file for complete search history.

(56) References Cited

U.S. PATENT DOCUMENTS

| | | |
|---|---|---|
| 2012/0094090 A1* | 4/2012 | Yamazaki .............. H05K 3/046 |
| | | 977/890 |
| 2017/0364119 A1 | 12/2017 | Lee et al. |
| 2018/0011515 A1 | 1/2018 | Yoo et al. |
| 2019/0268455 A1 | 8/2019 | Baek et al. |
| 2020/0264660 A1 | 8/2020 | Song et al. |
| 2020/0341517 A1 | 10/2020 | Yang et al. |
| 2021/0044683 A1 | 2/2021 | He et al. |
| 2021/0385315 A1* | 12/2021 | Cha ....................... G06F 1/1675 |

FOREIGN PATENT DOCUMENTS

| | | |
|---|---|---|
| KR | 10-2020-0041846 A | 4/2020 |
| KR | 10-2020-0117741 A | 10/2020 |
| KR | 10-2020-0124989 A | 11/2020 |
| KR | 10-2021-0031348 A | 3/2021 |

\* cited by examiner (a)

(b)

[a]

[b]

(a)

(b)

[a]

[b]

(a)

(b)

SUPPORT MEMBER SUPPORTING SLIDABLE DISPLAY AND ELECTRONIC DEVICE INCLUDING THE SAME

CROSS REFERENCE TO RELATED APPLICATION(S)

This application is a Continuation of and based on and claims priority under 35 U.S.C. § 120 to PCT International Application No. PCT/KR2021/015849, which was filed on Nov. 4, 2021, and claims priority to Korean Patent Application No. 10-2021-0088448, filed on Jul. 6, 2021, in the Korean Intellectual Property Office, the disclosures of which are incorporated by reference herein their entirety.

TECHNICAL FIELD

Certain embodiments of the disclosure relate to a support member supporting a slidable display and an electronic device including the same.

BACKGROUND ART

A display is a very important part of a portable electronic device. The display may visually represent information. Factors such as the design, size, and quality of the display can play an important role in consumers' choice of electronic devices.

A flexible display allows implementing a display in which a display screen size is variable. For example, an electronic device that includes a flexible display can have a screen size increased or decreased through sliding (slidable display) or the flexible display being rolled about the surface of the electronic device (rollable display).

BACKGROUND

In an electronic device including a rollable or slidable display, the display may be deformed (e.g., bending) in a certain section.

Therefore, a structure capable of supporting the deformable display may be used. For example, in the section where the display is deformed, the display may have a certain curvature. A support structure supporting the curvature of the display when deformed may be used.

Certain embodiments of the disclosure may provide a support member capable of stably supporting a display that is deformed in part in response to sliding.

According to certain embodiments of the disclosure, an electronic device may include a first housing; a second housing slidably combined with the first housing; a display fixed at least in part to the second housing and having an visible display area increasing or decreasing in response to a sliding of the second housing, wherein the visible display area is a portion viewed from an outside of the electronic device; and a support structure having a bendable structure, supporting at least a portion of the display, and moving in response to the sliding of the second housing, the support structure comprising one or more support members, and guide rail, wherein each one of the one or more the support members include: a base member extending in a first direction perpendicular to a sliding direction of the second housing and arranged along the sliding direction, and connected to the guide rail, wherein the guide rail guides the movement of the base member; a moving member formed in a shape corresponding at least in part to a receiving groove formed in the base member and inserted at least in part into the receiving groove, and a fixing member fixing the base member and the moving member to the display.

According to certain embodiments, a display support member comprises a base member extending in a first direction perpendicular to a sliding direction of a display and arranged along the sliding direction, wherein the base member is connected to a guide rail, and the guide rail guides movement of the base member; a moving member formed in a shape corresponding at least in part to a receiving groove formed in the base member and inserted at least in part into the receiving groove; and a fixing member fixing the base member and the moving member to the display.

According to certain embodiments of the disclosure, it is possible to provide a support structure capable of effectively supporting a display being deformed. The support structure supporting a deformed portion of the display can avoid damage to the deformed portion of the display.

DESCRIPTION OF DRAWINGS

In connection with the description of the drawings, the same or similar reference numerals may be used for the same or similar components.

DETAILED DESCRIPTION

Figure 1:
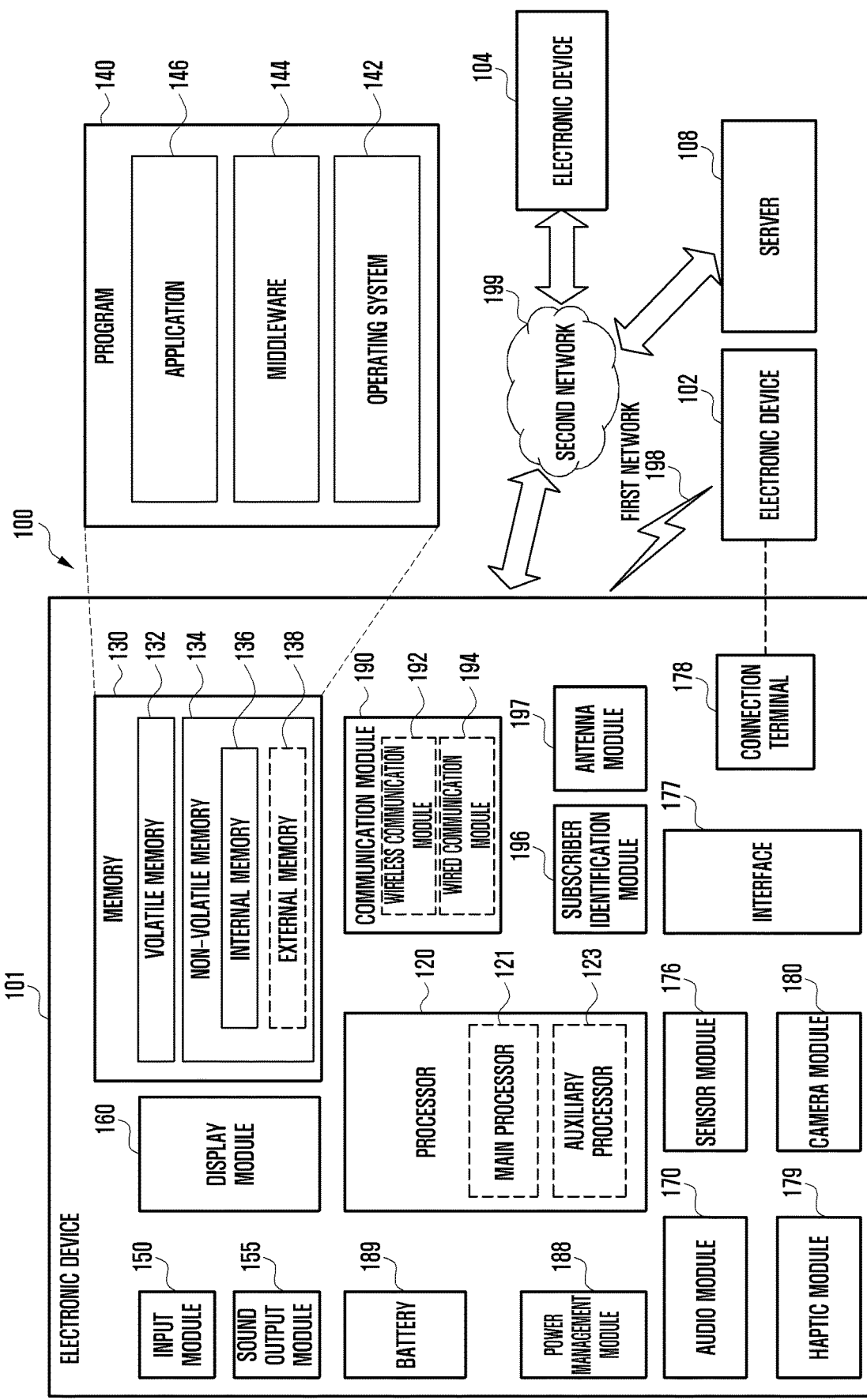
FIG. 1 is a block diagram of an electronic device in a network environment according to certain embodiments of the disclosure.

An electronic device can include a flexible display. The flexible display allows the user to change (increase or decrease) the screen size. The screen size can be changed by changing a dimension of the electronic device. The dimension can be changed by, for example, telescopically extending or retracting one part of the housing from another part of the housing. When the dimension is changed, the flexible display rolls about an edge of the electronic display to cover the additional area, or retract from the reduced area.

The flexible display is supported by a support structure. The support structure moves about a portion of rear surface, a portion of the front surface, and an edge connecting them. The support structure includes a guide rail guiding movement of a base member. A moving member is disposed in a receiving groove of a base member. The foregoing applies very little stress to the flexible display in the deformed portion, thereby avoiding damage.

It should be appreciated that certain embodiments of the present disclosure and the terms used therein are not intended to limit the technological features set forth herein to particular embodiments and include various changes, equivalents, or replacements for a corresponding embodiment.

With regard to the description of the drawings, similar reference numerals may be used to refer to similar or related elements. It is to be understood that a singular form of a noun corresponding to an item may include one or more of the things, unless the relevant context clearly indicates otherwise.

As used herein, each of such phrases as "A or B," "at least one of A and B," "at least one of A or B," "A, B, or C," "at least one of A, B, and C," and "at least one of A, B, or C," may include any one of, or all possible combinations of the items enumerated together in a corresponding one of the phrases. As used herein, such terms as "1st" and "2nd," or "first" and "second" may be used to simply distinguish a corresponding component from another, and does not limit the components in other aspect (e.g., importance or order). It is to be understood that if an element (e.g., a first element) is referred to, with or without the term "operatively" or "communicatively", as "coupled with," "coupled to," "connected with," or "connected to" another element (e.g., a second element), it means that the element may be coupled with the other element directly (e.g., wiredly), wirelessly, or via a third element.

FIG. 1 is a block diagram illustrating an electronic device 101 in a network environment 100 according to certain embodiments. Referring to FIG. 1, the electronic device 101 in the network environment 100 may communicate with an electronic device 102 via a first network 198 (e.g., a short-range wireless communication network), or at least one of an electronic device 104 or a server 108 via a second network 199 (e.g., a long-range wireless communication network). According to an embodiment, the electronic device 101 may communicate with the electronic device 104 via the server 108. According to an embodiment, the electronic device 101 may include a processor 120, memory 130, an input module 150, a sound output module 155, a display module 160, an audio module 170, a sensor module 176, an interface 177, a connecting terminal 178, a haptic module 179, a camera module 180, a power management module 188, a battery 189, a communication module 190, a subscriber identification module (SIM) 196, or an antenna module 197. In some embodiments, at least one of the components (e.g., the connecting terminal 178) may be omitted from the electronic device 101, or one or more other components may be added in the electronic device 101. In some embodiments, some of the components (e.g., the sensor module 176, the camera module 180, or the antenna module 197) may be implemented as a single component (e.g., the display module 160).

The processor 120 may execute, for example, software (e.g., a program 140) to control at least one other component (e.g., a hardware or software component) of the electronic device 101 coupled with the processor 120, and may perform various data processing or computation. According to one embodiment, as at least part of the data processing or computation, the processor 120 may store a command or data received from another component (e.g., the sensor module 176 or the communication module 190) in volatile memory 132, process the command or the data stored in the volatile memory 132, and store resulting data in non-volatile memory 134. According to an embodiment, the processor 120 may include a main processor 121 (e.g., a central processing unit (CPU) or an application processor (AP)), or an auxiliary processor 123 (e.g., a graphics processing unit (GPU), a neural processing unit (NPU), an image signal processor (ISP), a sensor hub processor, or a communication processor (CP)) that is operable independently from, or in conjunction with, the main processor 121. For example, when the electronic device 101 includes the main processor 121 and the auxiliary processor 123, the auxiliary processor 123 may be adapted to consume less power than the main processor 121, or to be specific to a specified function. The auxiliary processor 123 may be implemented as separate from, or as part of the main processor 121.

The auxiliary processor 123 may control at least some of functions or states related to at least one component (e.g., the display module 160, the sensor module 176, or the communication module 190) among the components of the electronic device 101, instead of the main processor 121 while the main processor 121 is in an inactive (e.g., sleep) state, or together with the main processor 121 while the main processor 121 is in an active state (e.g., executing an application). According to an embodiment, the auxiliary processor 123 (e.g., an image signal processor or a communication processor) may be implemented as part of another component (e.g., the camera module 180 or the communication module 190) functionally related to the auxiliary processor 123. According to an embodiment, the auxiliary processor 123 (e.g., the neural processing unit) may include a hardware structure specified for artificial intelligence model processing. An artificial intelligence model may be generated by machine learning. Such learning may be performed, e.g., by the electronic device 101 where the artificial intelligence is performed or via a separate server (e.g., the server 108). Learning algorithms may include, but are not limited to, e.g., supervised learning, unsupervised learning, semi-supervised learning, or reinforcement learning. The artificial intelligence model may include a plurality of artificial neural network layers. The artificial neural network may be a deep neural network (DNN), a convolutional neural network (CNN), a recurrent neural network (RNN), a restricted boltzmann machine (RBM), a deep belief network (DBN), a bidirectional recurrent deep neural network (BRDNN), deep Q-network or a combination of two or more thereof but is not limited thereto. The artificial intelligence model may, additionally or alternatively, include a software structure other than the hardware structure.

The memory 130 may store various data used by at least one component (e.g., the processor 120 or the sensor module 176) of the electronic device 101. The various data may include, for example, software (e.g., the program 140) and input data or output data for a command related thereto. The memory 130 may include the volatile memory 132 or the non-volatile memory 134.

The program 140 may be stored in the memory 130 as software, and may include, for example, an operating system (OS) 142, middleware 144, or an application 146.

The input module 150 may receive a command or data to be used by another component (e.g., the processor 120) of the electronic device 101, from the outside (e.g., a user) of the electronic device 101. The input module 150 may include, for example, a microphone, a mouse, a keyboard, a key (e.g., a button), or a digital pen (e.g., a stylus pen).

The sound output module 155 may output sound signals to the outside of the electronic device 101. The sound output module 155 may include, for example, a speaker or a receiver. The speaker may be used for general purposes, such as playing multimedia or playing record. The receiver may be used for receiving incoming calls. According to an embodiment, the receiver may be implemented as separate from, or as part of the speaker.

The display module 160 may visually provide information to the outside (e.g., a user) of the electronic device 101. The display module 160 may include, for example, a display, a hologram device, or a projector and control circuitry to control a corresponding one of the display, hologram device, and projector. According to an embodiment, the display module 160 may include a touch sensor adapted to detect a touch, or a pressure sensor adapted to measure the intensity of force incurred by the touch.

The audio module 170 may convert a sound into an electrical signal and vice versa. According to an embodiment, the audio module 170 may obtain the sound via the input module 150, or output the sound via the sound output module 155 or a headphone of an external electronic device (e.g., an electronic device 102) directly (e.g., wiredly) or wirelessly coupled with the electronic device 101.

The sensor module 176 may detect an operational state (e.g., power or temperature) of the electronic device 101 or an environmental state (e.g., a state of a user) external to the electronic device 101, and then generate an electrical signal or data value corresponding to the detected state. According to an embodiment, the sensor module 176 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 177 may support one or more specified protocols to be used for the electronic device 101 to be coupled with the external electronic device (e.g., the electronic device 102) directly (e.g., wiredly) or wirelessly. According to an embodiment, the interface 177 may include, for example, a high definition multimedia interface (HDMI), a universal serial bus (USB) interface, a secure digital (SD) card interface, or an audio interface.

A connecting terminal 178 may include a connector via which the electronic device 101 may be physically connected with the external electronic device (e.g., the electronic device 102). According to an embodiment, the connecting terminal 178 may include, for example, a HDMI connector, a USB connector, a SD card connector, or an audio connector (e.g., a headphone connector).

The haptic module 179 may convert an electrical signal into a mechanical stimulus (e.g., a vibration or a movement) or electrical stimulus which may be recognized by a user via his tactile sensation or kinesthetic sensation. According to an embodiment, the haptic module 179 may include, for example, a motor, a piezoelectric element, or an electric stimulator.

The camera module 180 may capture a still image or moving images. According to an embodiment, the camera module 180 may include one or more lenses, image sensors, image signal processors, or flashes.

The power management module 188 may manage power supplied to the electronic device 101. According to one embodiment, the power management module 188 may be implemented as at least part of, for example, a power management integrated circuit (PMIC).

The battery 189 may supply power to at least one component of the electronic device 101. According to an embodiment, the battery 189 may include, for example, a primary cell which is not rechargeable, a secondary cell which is rechargeable, or a fuel cell.

The communication module 190 may support establishing a direct (e.g., wired) communication channel or a wireless communication channel between the electronic device 101 and the external electronic device (e.g., the electronic device 102, the electronic device 104, or the server 108) and performing communication via the established communication channel. The communication module 190 may include one or more communication processors that are operable independently from the processor 120 (e.g., the application processor (AP)) and supports a direct (e.g., wired) communication or a wireless communication. According to an embodiment, the communication module 190 may include a wireless communication module 192 (e.g., a cellular communication module, a short-range wireless communication module, or a global navigation satellite system (GNSS) communication module) or a wired communication module 194 (e.g., a local area network (LAN) communication module or a power line communication (PLC) module). A corresponding one of these communication modules may communicate with the external electronic device via the first network 198 (e.g., a short-range communication network, such as Bluetooth™, wireless-fidelity (Wi-Fi) direct, or infrared data association (IrDA)) or the second network 199 (e.g., a long-range communication network, such as a legacy cellular network, a 5G network, a next-generation communication network, the Internet, or a computer network (e.g., LAN or wide area network (WAN)). These various types of communication modules may be implemented as a single component (e.g., a single chip), or may be implemented as multi components (e.g., multi chips) separate from each other. The wireless communication module 192 may identify and authenticate the electronic device 101 in a communication network, such as the first network 198 or the second network 199, using subscriber information (e.g., international mobile subscriber identity (IMSI)) stored in the subscriber identification module 196.

The wireless communication module 192 may support a 5G network, after a 4G network, and next-generation communication technology, e.g., new radio (NR) access technology. The NR access technology may support enhanced mobile broadband (eMBB), massive machine type communications (mMTC), or ultra-reliable and low-latency communications (URLLC). The wireless communication module 192 may support a high-frequency band (e.g., the mmWave band) to achieve, e.g., a high data transmission rate. The wireless communication module 192 may support various technologies for securing performance on a high-frequency band, such as, e.g., beamforming, massive multiple-input and multiple-output (massive MIMO), full dimensional MIMO (FD-MIMO), array antenna, analog beam-forming, or large scale antenna. The wireless communication module 192 may support various requirements specified in the electronic device 101, an external electronic device (e.g., the electronic device 104), or a network system (e.g., the second network 199). According to an embodiment, the wireless communication module 192 may support a peak data rate (e.g., 20 Gbps or more) for implementing eMBB, loss coverage (e.g., 164 dB or less) for implementing mMTC, or U-plane latency (e.g., 0.5 ms or less for each of downlink (DL) and uplink (UL), or a round trip of 1 ms or less) for implementing URLLC.

The antenna module 197 may transmit or receive a signal or power to or from the outside (e.g., the external electronic device) of the electronic device 101. According to an embodiment, the antenna module 197 may include an antenna including a radiating element composed of a conductive material or a conductive pattern formed in or on a substrate (e.g., a printed circuit board (PCB)). According to an embodiment, the antenna module 197 may include a plurality of antennas (e.g., array antennas). In such a case, at least one antenna appropriate for a communication scheme used in the communication network, such as the first network 198 or the second network 199, may be selected, for example, by the communication module 190 (e.g., the wireless communication module 192) from the plurality of antennas. The signal or the power may then be transmitted or received between the communication module 190 and the external electronic device via the selected at least one antenna. According to an embodiment, another component (e.g., a radio frequency integrated circuit (RFIC)) other than the radiating element may be additionally formed as part of the antenna module 197.

According to certain embodiments, the antenna module 197 may form a mmWave antenna module. According to an embodiment, the mmWave antenna module may include a printed circuit board, a RFIC disposed on a first surface (e.g., the bottom surface) of the printed circuit board, or adjacent to the first surface and capable of supporting a designated high-frequency band (e.g., the mmWave band), and a plurality of antennas (e.g., array antennas) disposed on a second surface (e.g., the top or a side surface) of the printed circuit board, or adjacent to the second surface and capable of transmitting or receiving signals of the designated high-frequency band.

At least some of the above-described components may be coupled mutually and communicate signals (e.g., commands or data) therebetween via an inter-peripheral communication scheme (e.g., a bus, general purpose input and output (GPIO), serial peripheral interface (SPI), or mobile industry processor interface (MIPI)).

According to an embodiment, commands or data may be transmitted or received between the electronic device 101 and the external electronic device 104 via the server 108 coupled with the second network 199. Each of the electronic devices 102 or 104 may be a device of a same type as, or a different type, from the electronic device 101. According to an embodiment, all or some of operations to be executed at the electronic device 101 may be executed at one or more of the external electronic devices 102, 104, or 108. For example, if the electronic device 101 should perform a function or a service automatically, or in response to a request from a user or another device, the electronic device 101, instead of, or in addition to, executing the function or the service, may request the one or more external electronic devices to perform at least part of the function or the service. The one or more external electronic devices receiving the request may perform the at least part of the function or the service requested, or an additional function or an additional service related to the request, and transfer an outcome of the performing to the electronic device 101. The electronic device 101 may provide the outcome, with or without further processing of the outcome, as at least part of a reply to the request. To that end, a cloud computing, distributed computing, mobile edge computing (MEC), or client-server computing technology may be used, for example. The electronic device 101 may provide ultra low-latency services using, e.g., distributed computing or mobile edge computing. In another embodiment, the external electronic device 104 may include an internet-of-things (IoT) device. The server 108 may be an intelligent server using machine learning and/or a neural network. According to an embodiment, the external electronic device 104 or the server 108 may be included in the second network 199. The electronic device 101 may be applied to intelligent services (e.g., smart home, smart city, smart car, or healthcare) based on 5G communication technology or IoT-related technology.

The display module 160 can include a flexible display allows the user to change (increase or decrease) the screen size. The screen size can be changed by changing a dimension of the electronic device 101. When the dimension is changed, the flexible display rolls about an edge of the electronic display 101 to cover the additional area, or retract from the reduced area.

Figure 2A:
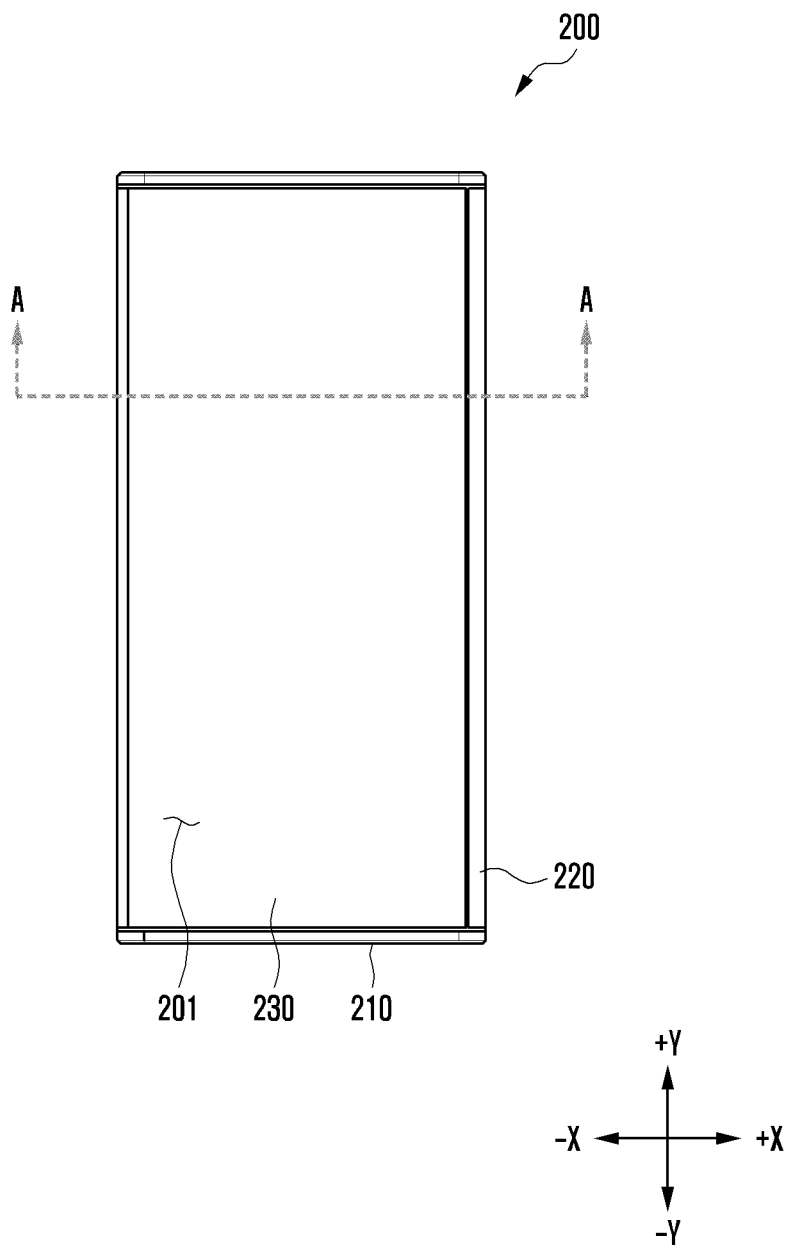
FIGS. 2A and 2B are diagrams illustrating various states of an electronic device according to certain embodiments of the disclosure.
Figure 2B:
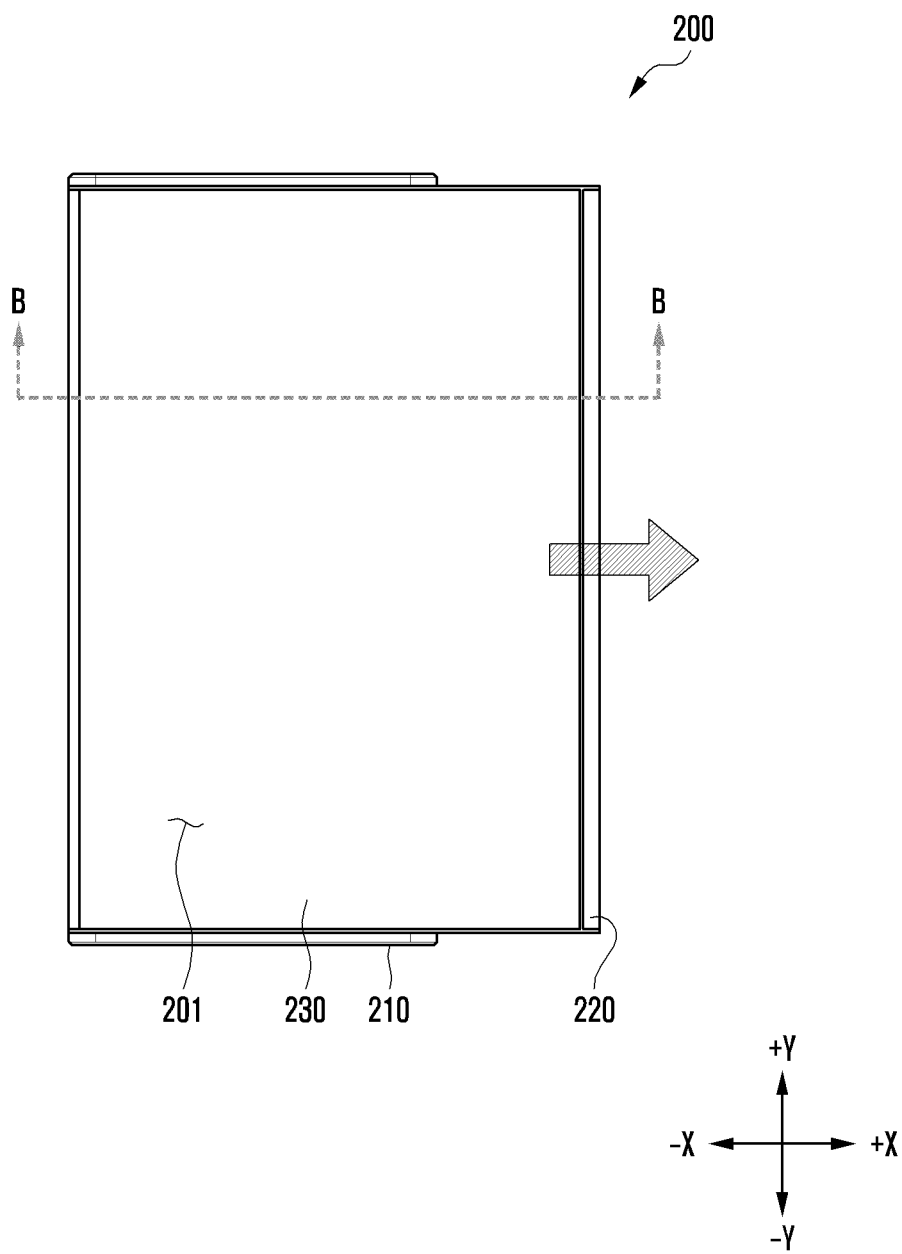
Figure 2C:
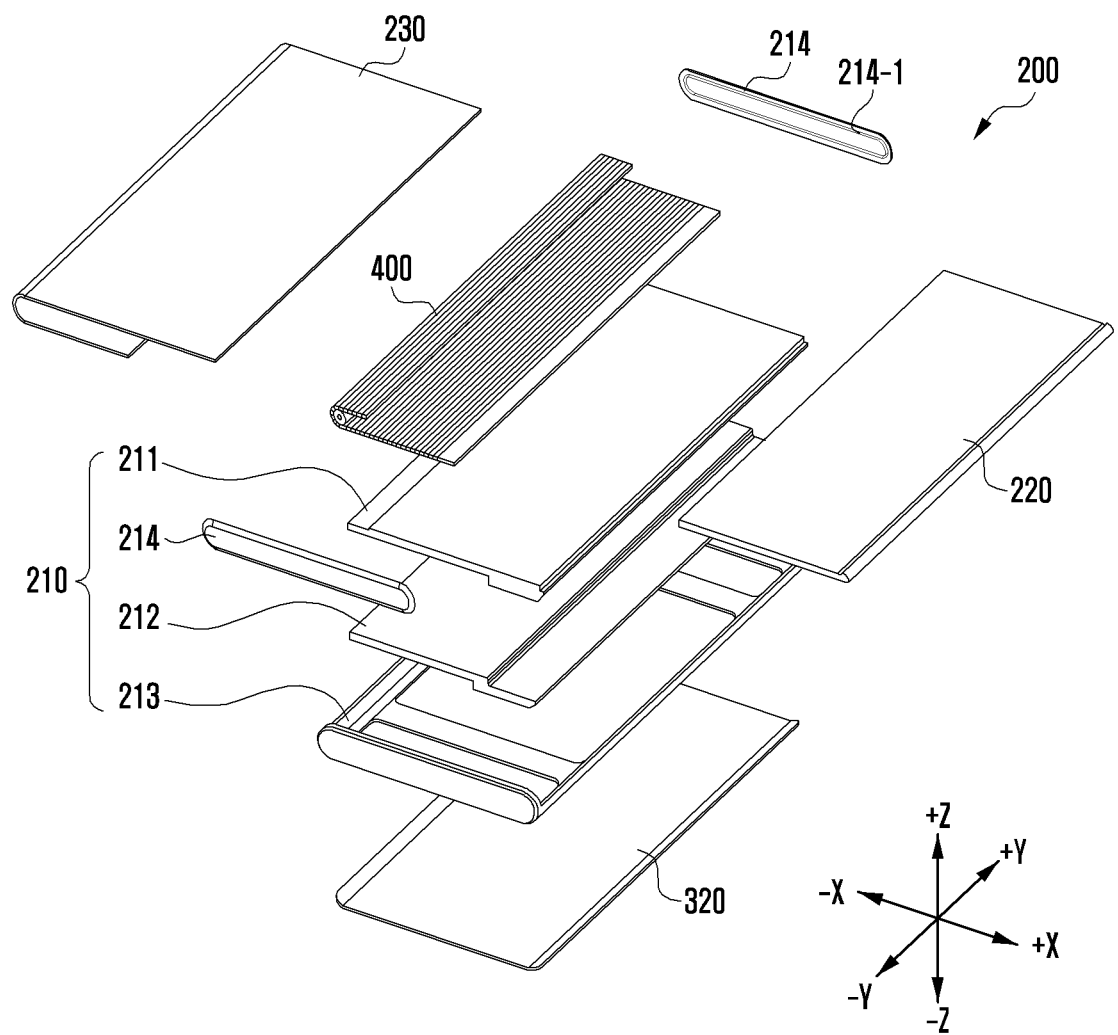
FIG. 2C is an exploded perspective view of an electronic device according to certain embodiments of the disclosure.

FIGS. 2A-2C show the flexible display and the housing in more detail. The dimension of the electronic device 200 can be changed by extending/retracting a second housing 220 from a first housing 210. When the second housing 220 is extended from the first housing 210 (see FIG. 2B), a portion of the display 230 is moved about an edge of the electronic device 200. A one or more support members 400 supports the portion the display 230 that moves about the edge of the electronic device 200.

FIGS. 2A and 2B are diagrams illustrating various states of an electronic device according to certain embodiments of the disclosure. FIG. 2C is an exploded perspective view of an electronic device according to certain embodiments of the disclosure.

According to certain embodiments, the electronic device 200 shown in FIGS. 2A to 2C may be one of the electronic devices 101 described with reference to FIG. 1.

Referring to FIGS. 2A and 2B, the electronic device 200 may be implemented so that an visible display area 201 of a display 230 increases or decreases through sliding. Here, the visible display area 201 may be a portion of the display 230 that is viewed or visible from the outside of the electronic device 200. Information outputted on the display 230 may be seen by the user through the visible display area 201.

According to certain embodiments, the visible display area 201 may increase or decrease by a sliding operation of the electronic device 200. In an embodiment, the sliding operation of the electronic device 200 may refer to sliding of a second housing 220 with respect to a first housing 210. In FIGS. 2A and 2B, the second housing 220 may slide with respect to the first housing 210 in the +X direction or the −X direction.

According to certain embodiments, by the sliding operation, the electronic device 200 may change from a standard state (e.g., the state shown in FIG. 2A) to a sliding state (e.g., the state shown in FIG. 2B).

The standard state may refer to a state in which the end of the first housing 210 and the end of the second housing 220 are substantially coincident. For example, as shown in FIG. 2A, the standard state may refer to a state in which the second housing 220 does not protrude with respect to the first housing 210 or the first housing 210 does not protrude with respect to the second housing 220. The standard state may mean a state in which the first housing 210 and the second housing 220 are aligned with each other. The standard state may be understood as a closed state or a slide-in state.

The sliding state may refer to a state in which the second housing 220 is slid with respect to the first housing 210 from the standard state. The visible display area 201 of the display 230 in the sliding state may be larger than the visible display area 201 of the display 230 in the standard state. The sliding state may be understood as an open state or a slide-out state.

The display 230 in which the visible display area 201 is variable in response to the sliding operation may be defined as a "slidable display". In addition, the display 230 may bend in part while being guided by a roller (e.g., a roller 330 in FIG. 3A) to be described later. The display 230 that is guided by the roller and bends in part may be defined as a "rollable display". The display 230 described hereinafter may be understood as a "slidable or rollable display".

According to an embodiment, the sliding of the second housing 220 with respect to the first housing 210 may be performed semi-automatically. For example, the sliding of the second housing 220 with respect to the first housing 210 may be performed by a member (not shown) providing an elastic force in a sliding direction. In this case, when the sliding of the second housing 220 with respect to the first housing 210 is partially made, the remaining sliding of the second housing 220 may be performed by the elastic force provided to the first housing 210 and/or the second housing 220.

According to an embodiment, the sliding of the second housing 220 with respect to the first housing 210 may be performed automatically. For example, the second housing 220 may be slid with respect to the first housing 210 by a motor (not shown). The motor for sliding the second housing 220 may operate in response to signals inputted through various buttons and sensors included in the electronic device 200.

According to certain embodiments, the first housing 210 may include at least one sub-housing 211, 212, 213 and a guide housing 214. For example, as shown in FIG. 2C, the first housing 210 may include a first sub-housing 211, a second sub-housing 212, a third sub-housing 213, and the guide housing 214. In an embodiment, an accommodating space (e.g., the accommodating space 310 in FIG. 3A) for accommodating a portion of the display 230 may be provided between the third sub-housing 213 and the second sub-housing 212. In an embodiment, there may be a pair of the guide housings 214, which may be combined with an assembly of the first sub-housing 211, the second sub-housing 212, and the third sub-housing 213 in both lateral directions (e.g., the +Y direction and the −Y direction in FIG. 3B) of the electronic device 200. The guide housing 214 may include a guide rail 214-1. The guide rail 214-1 may be a groove formed in the guide housing 214 to guide sliding motions of the second housing 220 and a one or more support members 400. As the second housing 220 and a protrusion (e.g., a guide protrusion 413 in FIG. 4) formed on the one or more support members 400 are slid while being inserted into the guide rail 214-1, the guide rail 214-1 may guide the sliding of the second housing 220 and the one or more support members 400.

According to certain embodiments, the second housing 220 may support a portion of the display 230. The display 230 is fixed at least in part to the second housing 220 and may move along with the second housing 220 when the second housing 220 is slid with respect to the first housing 210.

According to certain embodiments, the one or more support members 400 may support a portion of the display 230. The one or more support members 400 may include a bendable structure. For example, the one or more support members 400 may include a structure in which a plurality of bars (e.g., base members 410 in FIG. 3B) extending in a direction (e.g., the Y-axis direction in FIG. 3B) perpendicular to the sliding direction (e.g., the X-axis direction in FIG. 3B) are arranged along the sliding direction. In addition, the one or more support members 400 may be configured in various bendable structures. For example, the one or more support members 400 may be a bendable plate, and may have a structure in which a plurality of grooves are formed to allow bending. The one or more support members 400 may be connected to the second housing 220 and slide with respect to the first housing 210 together with the second housing 220.

According to certain embodiments, the display 230 may be a flexible display 230 capable of bending. In an embodiment, the display 230 may include a flexible substrate. For example, the display 230 may include a substrate formed of a flexible polymer material such as polyimide (PI) or polyethylene terephthalate (PET). In addition, it may include a substrate made of a very thin glass material. The display 230 is supported by the second housing 220 and the one or more support members 400, and the visible display area 201, which is a portion viewed from the outside, may increase or decrease through the sliding of the second housing 220 with respect to the first housing 210. In an embodiment, the display 230 may further include a touch sensing circuit (e.g., a touch sensor). In addition, the display 230 may be combined with or disposed adjacent to a pressure sensor capable of measuring the intensity (pressure) of a touch and/or a digitizer detecting a pen input device (e.g., a stylus pen) of magnetic field scheme. For example, the digitizer may include a coil member disposed on a dielectric substrate to detect the resonance frequency of electromagnetic induction scheme applied from the pen input device.

According to certain embodiments, a rear cover 320 may be combined with the first housing 210 and thereby form a rear exterior of the electronic device 200. For example, as shown in FIG. 3B, the rear cover 320 may be combined with the first housing 210 in the −Z axis direction. The rear cover 320 may be formed of a transparent, opaque, or translucent material.

Figure 3A:
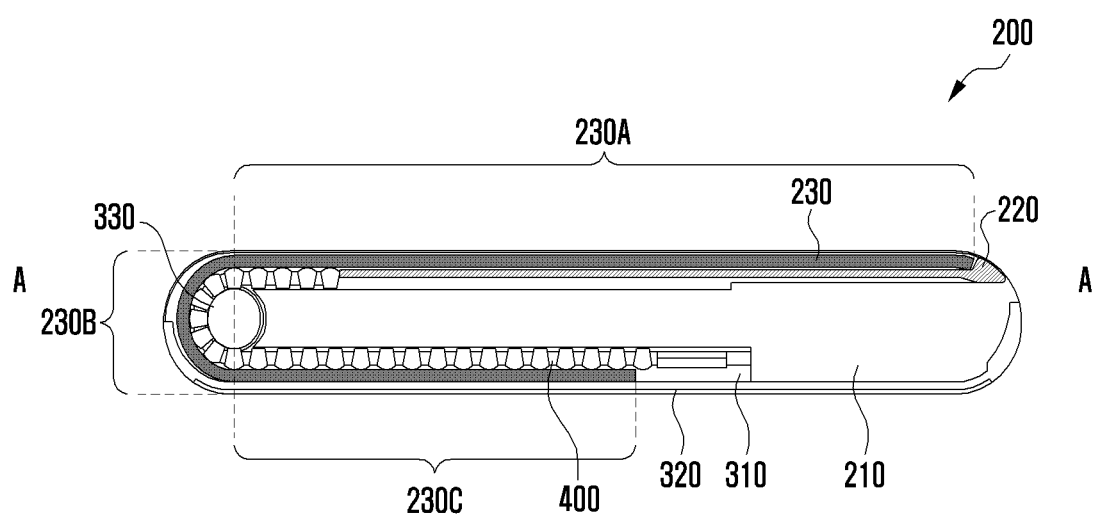
FIG. 3A is a cross-sectional view taken along the line A-A of the electronic device shown in FIG. 2A according to certain embodiments of the disclosure.
Figure 3A:
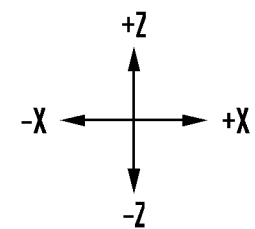
Figure 3B:
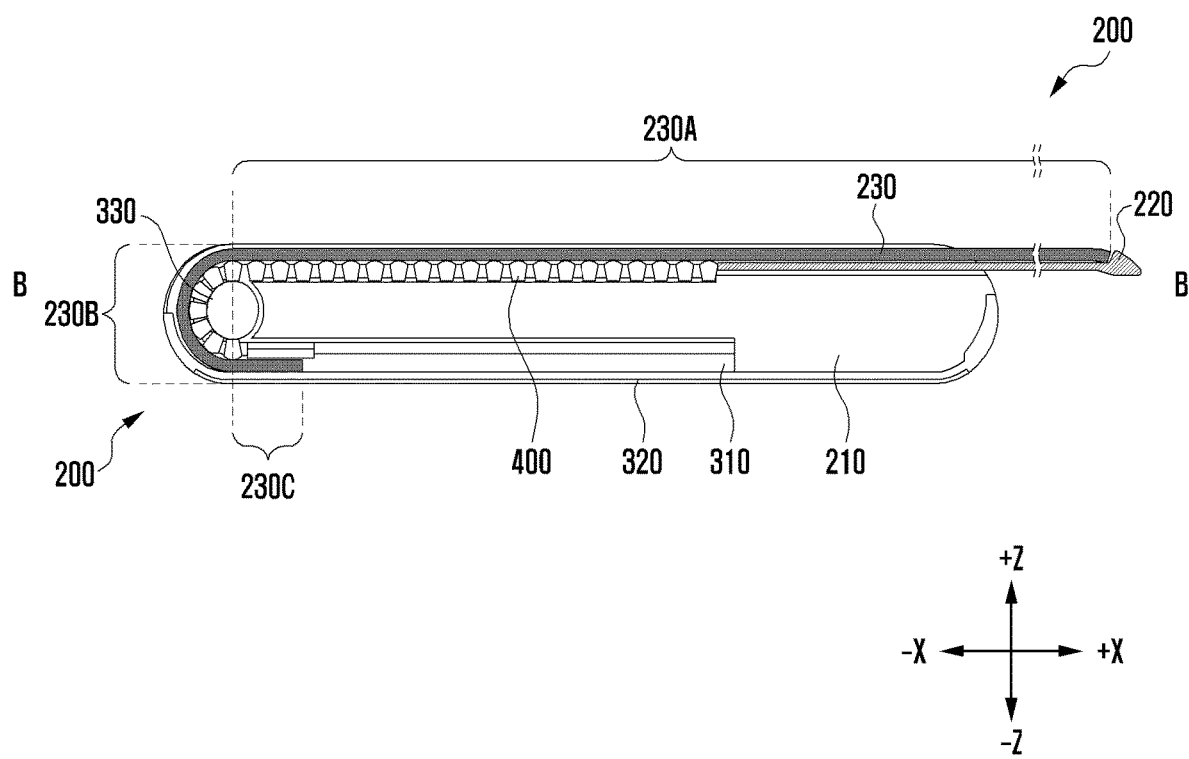
FIG. 3B is a cross-sectional view taken along the line B-B of the electronic device shown in FIG. 2B according to certain embodiments of the disclosure.

FIGS. 3A and 3B show a cross-section of the display 230 being extended in size (FIG. 3B). The display 230 includes a display region 230A that is visible. The remaining portion of the display includes a bending portion 230B that is bent about the edge of the electronic device 200, and an inserted region 230C. As can be seen, in FIG. 3B, the display region 230A increases in size, while inserted region 230C decreases. The one or more support members 400 moves the display that was in inserted region 230C and the bending region 230B in the standard state to the front surface of the electronic device 200.

FIG. 3A is a cross-sectional view taken along the line A-A of the electronic device shown in FIG. 2A according to certain embodiments of the disclosure. FIG. 3B is a cross-sectional view taken along the line B-B of the electronic device shown in FIG. 2B according to certain embodiments of the disclosure.

According to certain embodiments, the display 230 may include a plurality of regions. The plurality of regions described hereinafter may be regions divided according to positions where the display 230 is placed in the electronic device 200. For example, the display 230 may include a display region 230A where the display 230 is exposed to the outside of the electronic device 200, an inserted region 230C inserted inside the electronic device 200, and a bending region 230B connecting the display region 230A and the inserted region 230C. In an embodiment, the inserted region 230C of the display 230 may be a region indicating a portion of the display 230 accommodated in an accommodating space 310 included in the first housing 210. In an embodiment, a portion of the bending region 230B may also be viewed from the outside of the electronic device 200 depending on the shape of the housing surrounding the display 230.

As the electronic device 200 slides, the sizes of the display region 230A and the inserted region 230C may vary.

For example, the size of the display region 230A in the standard state (e.g., the state shown in FIG. 3A) may be smaller than the size of the display region 230A in the sliding state (e.g., the state shown in FIG. 3B). The size of the inserted region 230C in the standard state may be larger than the size of the inserted region 230C in the sliding state. The respective regions of the display 230 are merely divided for convenience of description and may not be visually distinct regions.

According to certain embodiments, when the second housing 220 is slid in the +X direction in FIGS. 3A and 3B, the display 230 connected to the second housing 220 moves to cause the display region 230A to increase and the inserted region 230C to decrease.

According to certain embodiments, the one or more support members 400 may be configured to support at least in part the display region 230A, the bending region 230B, and/or the inserted region 230C of the display 230. At least a portion of the one or more support members 400 may be fixed to the display 230 and thereby move together with the display 230 in response to the movement of the display 230 by the sliding of the second housing 220. The movement of the one or more support members 400 may be guided by the guide rail (e.g., the guide rail 214-1 in FIG. 2C). The one or more support members 400 may be configured to be deformed at least in part. For example, as shown in FIGS. 3A and 3B, the one or more support members 400 supporting the bending region 230B may bend along the roller 330.

Portions of the display 230 are affixed to one or more support members 400. When the second housing 220 is extended from the first housing 210, the one or more support members 400 moves about the edge of housing. The one or more support members 400 moves about a guide rail 450 and includes base members 410, moving members 420, fixing members 430. The combination of the base members 410, moving members, and fixing members 430 provide very low stress against the display 230.

Figure 4:
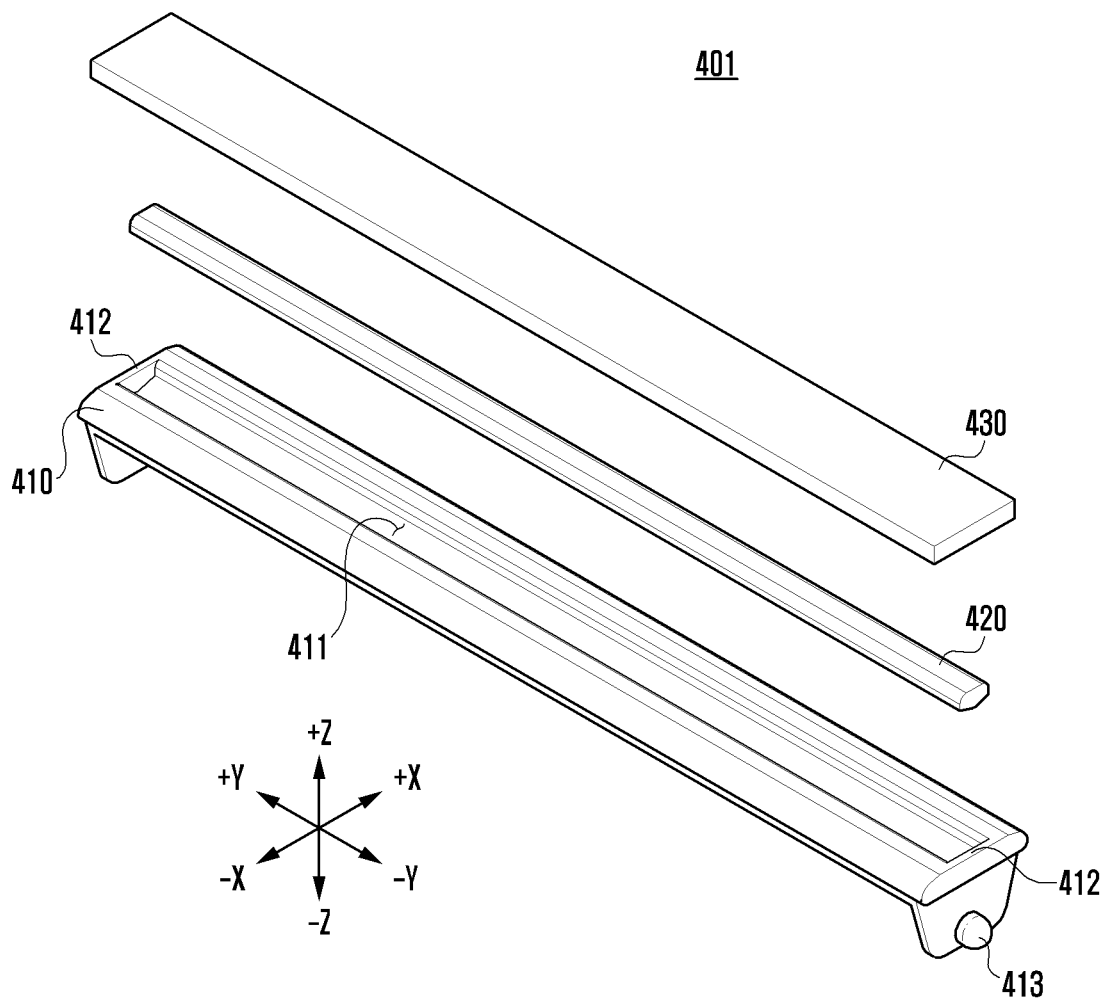
FIG. 4 is an exploded perspective view of one component of a support member according to certain embodiments of the disclosure.
Figure 5A:
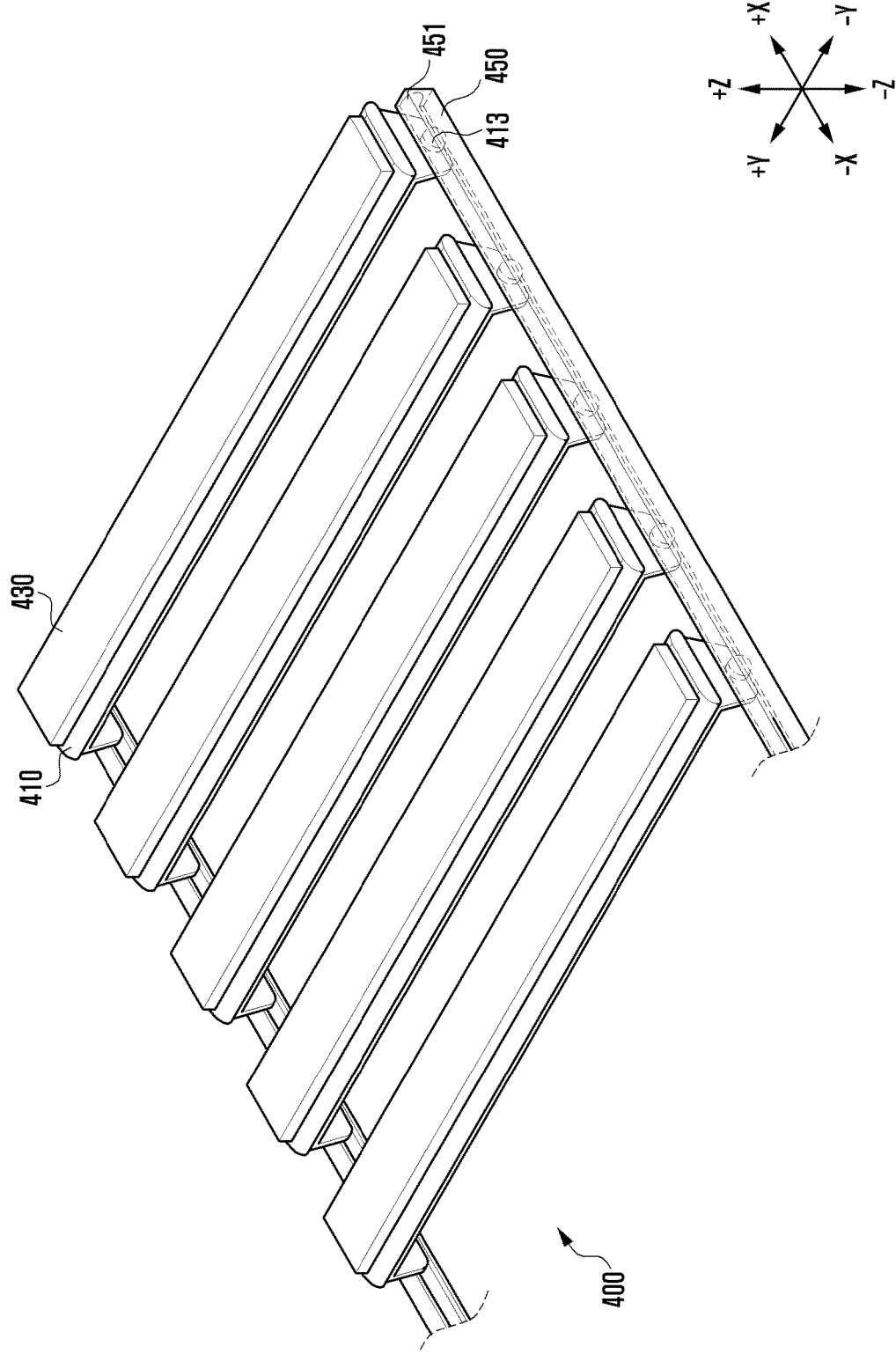
FIG. 5A is a perspective view of a support member according to certain embodiments of the disclosure.
Figure 5B:
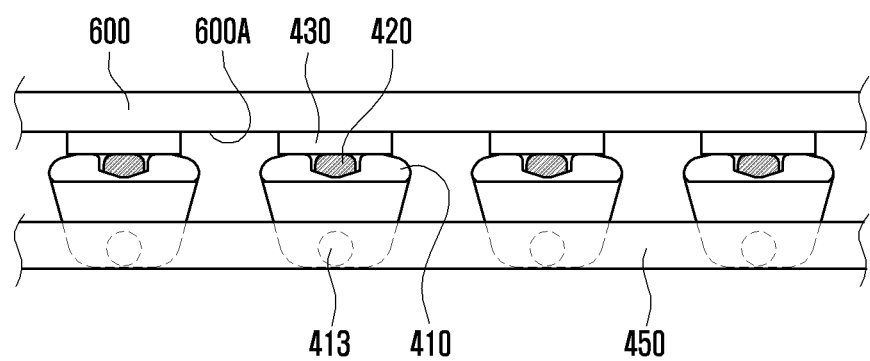
FIG. 5B is a view of the support member shown in FIG. 5A as viewed from the +Y/−Y direction in FIG. 5A.

FIG. 4 is an exploded perspective view of one component of a support member according to certain embodiments of the disclosure. FIG. 5A is a perspective view of a support member according to certain embodiments of the disclosure. FIG. 5B is a view of the support member shown in FIG. 5A as viewed from the +Y/−Y direction in FIG. 5A.

The A support structure includes one or more support members 400 and a guide rail 450, wherein the guide rail 450 guides movement of the one or more support members 400. A support member 401 can include a base member 410, a moving member 420, and a fixing member 430. The base member 410 is connected to the guide rail, such that the guide rail guides the movement of the base member 410.

The moving member 420 is seated in base member 410 with the fixing member 430 fixing the moving member 420 to the display 230. The moving member 420 can move about the Z axis with respect to the base member 410. Because of the flexibility of the moving member 420 with respect to the base member 410, the fixing member 430 can deform based on the curvature of the display 230 in the bending region 230B.

According to certain embodiments, the base member 410 may extend in a longitudinal direction and thus be formed of a bar shape. Here, the extending direction of the base member 410 may be a direction (e.g., the Y-axis direction in FIG. 4) perpendicular to a moving direction (e.g., the X-axis direction in FIG. 4) of the display (e.g., the display 230 in FIG. 3A). Also, the extending direction of the base member 410 may coincide with the horizontal or vertical direction of the display. Hereinafter, the extending direction of the base member 410 will be described as a "first direction". The shape of the base member 410 shown in FIG. 4 is exemplary only, and the shape of the base member 410 described in certain embodiments of the disclosure is not limited to the shape shown in FIG. 4.

According to certain embodiments, as shown in FIG. 5A, the plurality of base members 410 may be arranged along the moving direction of the display (e.g., the X-axis direction in FIG. 5A). In an embodiment, the base members 410 may be arranged at a predetermined interval.

In an embodiment, the movement of the base member 410 may be guided by the guide rail 450. The base member 410 may move along the shape of the guide rail 450. Referring to FIG. 5A, the guide rails 450 may be disposed at both ends of the base member 410. In other words, the base member 410 may be disposed between the two guide rails 450, and the movement thereof may be guided by the guide rails 450.

The base member 410 and the guide rail 450 may be combined with each other in various ways. The base member 410 and the guide rail 450 may be combined so that the base member 410 moves along the shape of the guide rail 450. For example, the guide rail 450 may have a guide groove 451 formed on an inner surface thereof. The inner surface of the guide rail 450 may refer to a surface facing the opposing guide rail 450. The base member 410 may have guide protrusions 413 formed on both ends thereof so as to be inserted into the guide grooves 451. The guide protrusion 413 may be formed integrally with the base member 410 using the same material as the base member 410, or formed separately from the base member 410 and then combined with the base member 410. When the guide protrusion 413 of the base member 410 is inserted into the guide groove 451 formed in the guide rail 450, the movement of the base member 410 may be restricted in a direction that the guide groove 451 is formed. For example, when the guide groove 451 is formed along the extending direction of the guide rail 450, the base member 410 may move only along the extending direction of the guide rail 450. Because the guide groove 451 and the guide protrusion 413 correspond to each other, in some embodiments, guide grooves may be formed at both ends of the base member 410 and guide projections may be formed on the inner surfaces of the guide rails 450. The above-described combining relationship between the base member 410 and the guide rail 450 is exemplary only, and the base member 410 and the guide rail 450 may be combined in various ways in which the movement of the base member 410 may be guided by the guide rail 450.

According to certain embodiments, the guide rail 450 may be combined with a housing (e.g., the first housing 210 or the second housing 220 in FIG. 2C) of an electronic device (e.g., the electronic device 200 in FIGS. 2A to 2C), formed in a part of the housing, or formed in various parts (e.g., the guide housing 214 in FIG. 2C).

According to certain embodiments, as shown in FIG. 5B, the base member 410 may support at least in part a rear surface 600A of a display 600 (e.g., the display 230 in FIGS. 2A to 3B). The base member 410 may be fixed to the rear surface 600A of the display 600 by the fixing member 430. Because the base member 410 is fixed to the rear surface 600A of the display 600 by the fixing member 430, the base member 410 may also move along with the movement of the display 600. The fixing member 430 may be formed of various materials capable of fixing the base member 410 to the display 600. For example, the fixing member 430 may be a pressure sensitive adhesive (PSA).

Referring to FIG. 4, the one or more support members 400 may further include the moving member 420. The moving member 420 may be formed in a shape corresponding at least in part to a receiving groove 411 formed in the base member 410. At least a portion of the moving member 420 may be disposed to be inserted into the receiving groove 411. The receiving groove 411 may be formed in each of the plurality of base members 410, and the moving member 420 may be accommodated in the receiving groove 411 formed in each of the base members 410.

The moving member 420 may be formed to extend in the same direction (e.g., the Y-axis direction in FIG. 4) as the base member 410. The moving member 420 may be formed to extend in a direction substantially perpendicular to the moving direction of the display 600. The moving member 420 may be formed to extend in the first direction. Because the moving member 420 is accommodated in the receiving groove 411 of the base member 410, the moving members 420 may be arranged in the same direction as the base members 410. The moving members 420 may be arranged along the moving direction of the display.

According to certain embodiments, the receiving groove 411 of the base member 410 in which the moving member 420 is accommodated may have blocking walls 412 so that the moving member 420 does not separate from the base member 410 in the extending direction of the moving member 420. The blocking walls 412 may be disposed at both ends of the receiving groove 411 to close the receiving groove 411 in the first direction. The blocking walls 412 may be formed of the same material as the base member 410 and formed integrally with the base member 410, or it may be formed of a separate material and combined with the base member 410. In a state that the moving member 420 is inserted into the receiving groove 411 of the base member 410, the blocking walls 412 may restrict the movement of the moving member 420 in the first direction.

According to certain embodiments, in order to enable the moving member 420 to float with respect to the base member 410, the first and moving members 410 and 420 may not have a fixed relationship or a binding relationship. The moving member 420 is merely accommodated in the receiving groove 411 of the base member 410 and may not be bound to the base member 410. Accordingly, the moving member 420 may float in one direction with respect to the base member 410. For example, the moving member 420 may float in a direction (e.g., the +Z/−Z axis direction in FIG. 4) substantially perpendicular to the first direction. The floating of the moving member 420 with respect to the base member 410 allows the one or more support members 400 to further effectively support the bendable display 600 in a bending region (e.g., the bending region 600B in FIG. 6). A related description will be made later in detail.

In an embodiment, the moving member 420 may be fixed to the rear surface 600A of the display 600 by the fixing member 430. The fixing member 430 that fixes the base member 410 to the display 600 may also fix the moving member 420 to the display 600. The base member 410 and the moving member 420 may be fixed by the fixing member 430. Each one of the one or more support members 400 includes a base member 410, a moving member 420, and the moving member 420 may be fixed to the display 600 by the fixing member 430. When the display 600 moves, the base and moving members 410 and 420 fixed to the display 600 by the fixing member 430 may also move together with the display 600 while supporting the display 600.

Hereinafter, the same reference numerals will be used for the same components as those described in FIGS. 4, 5A, and 5B, and detailed descriptions thereof will be omitted, except where a special description exists.

Figure 6:
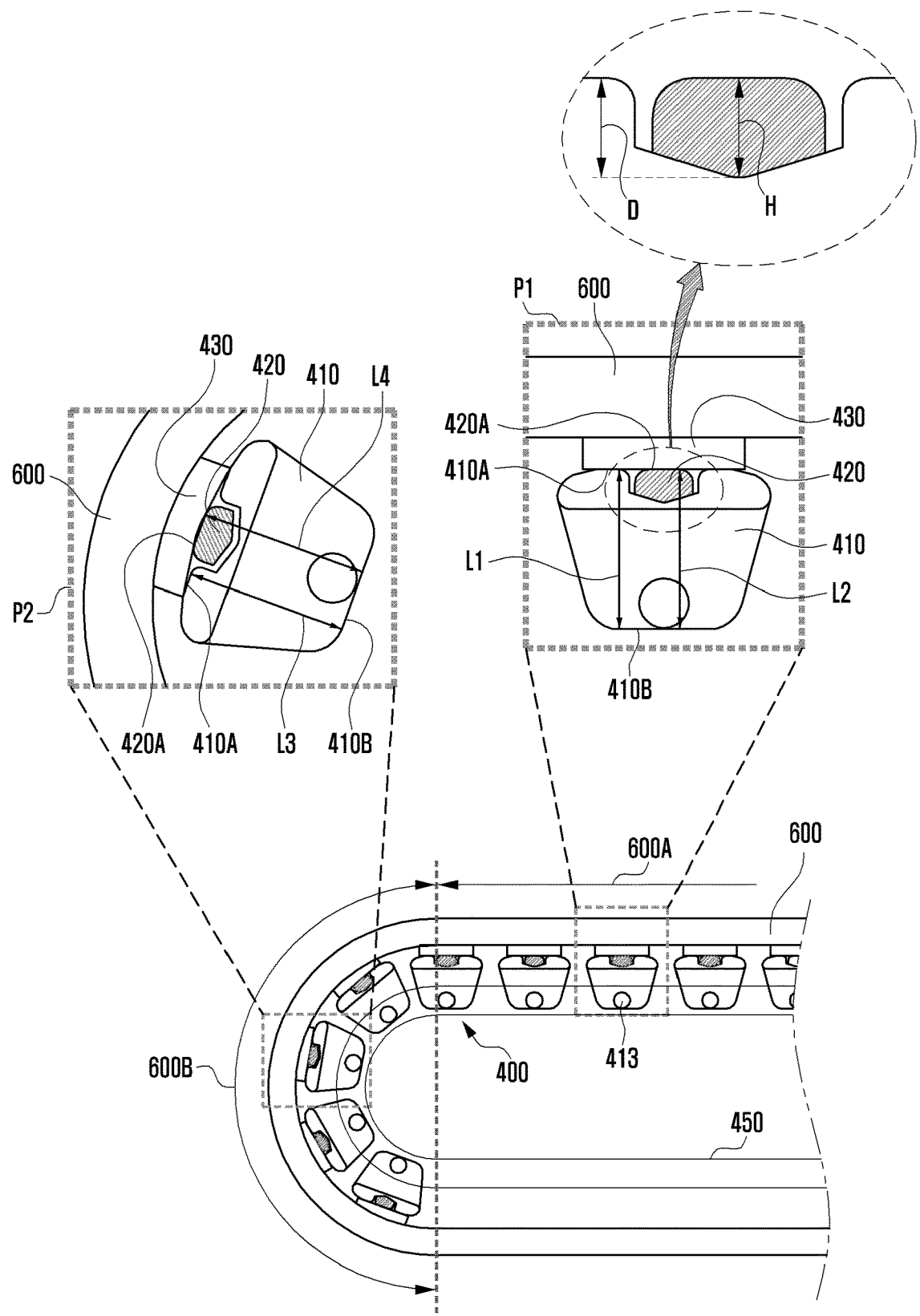
FIG. 6 is a view illustrating a state in which a support member supports a display according to certain embodiments of the disclosure.

FIG. 6 is a view illustrating a state in which a support member supports a display according to certain embodiments of the disclosure.

Hereinafter, a state in which the one or more support members 400 supports the display 600 in response to the movement of the display 600 will be described. The display 600 may include a bending region 600B and a flat region 600A. The distinction between the bending region 600B and the flat region 600A may be determined by whether the shape of the display 600 is deformed when the display 600 moves. For example, the display region 230A described in FIG. 3A is a portion where the display 600 is not deformed, and may be regarded as the flat region 600A shown in FIG. 6. The bending region 230B described in FIG. 3A is a portion where the display 600 bends and is thus deformed, and may be regarded as the bending region 600B shown in FIG. 6.

In the flat region 600A, the guide rail 450 may extend substantially in a straight line. In the bending region 600B, the guide rail 450 may have a curve. Because the movement of the one or more support members 400 is guided by the guide rail 450, the one or more support members 400 in the flat region 600A may move while maintaining a state of being substantially parallel to the display 600 by the guide rail 450 extending in a straight line. In the bending region 600B, an angle may occur between the adjacent support members 400 by the guide rail 450 having a curve. Thus, the base member 410 may support the display 600 in the bending region 600B of the display 600.

With reference to P1 of FIG. 6, in the flat region 600A, the moving member 420 may be maintained in close contact with the receiving groove 411 of the base member 410. When a surface of the base member 410 for supporting the display 600 is referred to as a first surface 410A, and when a surface of the moving member 420 for supporting the display 600 is referred to as a second surface 420A, a distance L1 between the first surface 410A and the rear surface 410B of the base member 410 may be equal to a distance L2 between the second surface 420A and the rear surface 410B of the base member 410. The fixing member 430 disposed between the first and moving members 410 and 420 and the display 600 may be attached to the first and second surfaces 410A and 420A and also attached to the rear surface of the display 600. In the flat region 600A, the display 600 maintains a horizontal state, and the first and second surfaces 410A and 420A are substantially parallel to each other without a step difference. So, the first and moving members 410 and 420 may correspond to the display 600 which is in a horizontal state.

In the flat region 600A, the height H of the moving member 420 and the depth D of the receiving groove 411 may be determined so that the first and moving members 410 and 420 can support the display 600 in a horizontal state. The height H of the base member 410 and the depth D of the receiving groove 411 may be determined so that the first and second surfaces 410A and 420A are substantially parallel to each other in a state that the moving member 420 is in close contact with the receiving groove 411.

Referring to FIG. 6, the receiving groove 411 may be formed to be inclined toward the center of the base member 410. The moving member 420 may be formed in a shape corresponding at least in part to the receiving groove 411. The receiving groove 411 may be formed in a central portion of the base member 410. When the moving member 420 is accommodated in the base member 410, it can be seen that the moving member 420 is accommodated in the central portion of the base member 410. Because the receiving groove 411 is formed to be inclined toward the center of the base member 410 and the moving member 420 is formed in a shape corresponding at least in part to the receiving groove 411, the moving member 420 may maintain a state of being disposed in the central portion of the base member 410 while being in close contact with the receiving groove 411.

Referring to P2 of FIG. 6, in the bending region 600B, at least a portion of the moving member 420 may be spaced apart from the base member 410. The display 600 may bend in the bending region 600B. Due to the curvature of the display 600 formed by bending, stress may be generated in the center direction of the fixing member 430. Because the moving member 420 is not fixed to the receiving groove 411 of the base member 410, it may be spaced apart from the base member 420 to allow deformation of the fixing member 430. In other words, the fixing member 430 is subjected to stress generated by the deformation of the display 600 in the bending region 600B, and the moving member 420 is spaced apart from the base member 410, so that the fixing member 430 may be partially deformed. In certain embodiments, by permitting the fixing member 430 to deform to the curve of the display 600 in the bending region 600B, stress against the display is considerably lowered.

In the bending region 600B, a step difference may occur between the second surface 420A of the moving member 420 for supporting the display 600 and the first surface 410A of the base member 410 for supporting the display 600. That is, in the bending region 600B, a distance L3 between the first surface 410A and the rear surface 410B of the base member 410 and a distance L4 of the second surface 420A and the rear surface 410B of the base member 410 may be different from each other. Because the moving member 420 is spaced apart from the receiving groove 411 of the base member 410 and thereby a step difference occurs between the first and second surfaces 410A and 420A, the display 600, even bending, may be effectively supported. That is, because a step difference exists between the plurality of surfaces (the first surface 410A and the second surface 420A) to correspond to the curvature of the bending display 600, it is possible to effectively support the display 600 in the bending region 600B.

FIGS. 7A to 7E are views illustrating a support member according to certain embodiments of the disclosure.

In the support member (e.g., the one or more support members 400 in FIG. 5A), the base member (e.g., the base member 410 in FIG. 4) and the moving member (e.g., the moving member 420 in FIG. 4) may be constructed in various shapes. The receiving groove (e.g., the receiving groove 411 in FIG. 4) of the base member in which the moving member is accommodated may be constructed to have a shape corresponding to the moving member.

Figure 7A:
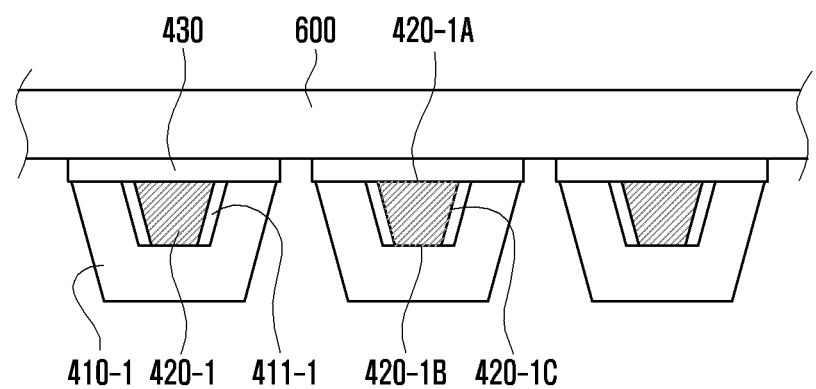
FIGS. 7A to 7E are views illustrating a support member according to certain embodiments of the disclosure.
Figure 7A:
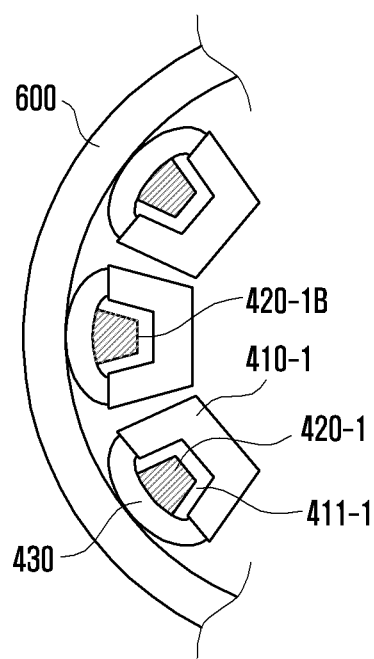

For example, as shown in FIG. 7A, the moving member 420-1 may be constructed in a trapezoidal shape, and the receiving groove 411-1 of the base member 410-1 may be constructed at least in part in a shape corresponding to the moving member 420-1. In the flat region ((a) of FIG. 7A), the moving member 420-1 may support the display 600 in a state of being at least in part in close contact with the receiving groove 411-1. For example, in FIG. 7A, when a surface of the moving member 420-1 on which the fixing member 430 is disposed is referred to as a front surface 420-1A of the moving member 420-1, and when a surface opposite to the surface on which the fixing member 430 is disposed is referred to as a rear surface 420-1B of the moving member 420-1, the rear surface 420-1B of the moving member 420-1 may be in close contact with the receiving groove 411-1. A lateral surface 420-1C of the moving member 420-1 other than the front and rear surfaces 420-1A and 420-1B may be spaced apart from the receiving groove 411-1. In the bending region ((b) of FIG. 7A), the moving member 420-1 may support the display 600 while being spaced apart from the receiving groove 411-1 at least in part. For example, in a state that the rear surface 420-1B of the moving member 420-1 is spaced apart from the receiving groove 411-1, the moving member 420-1 may support the display 600.

Figure 7B:
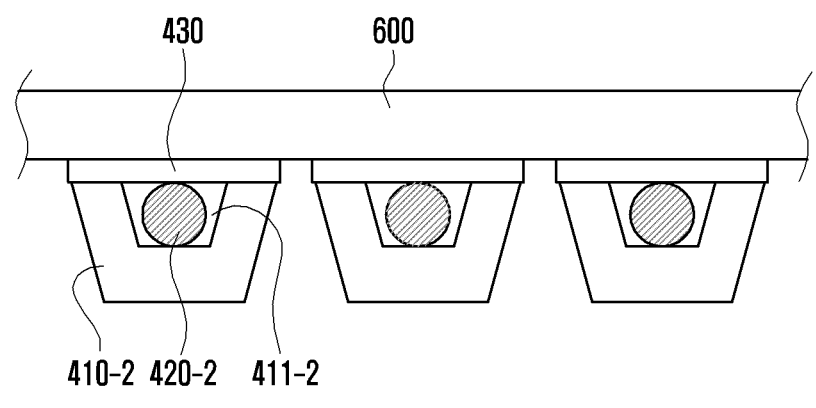
Figure 7B:
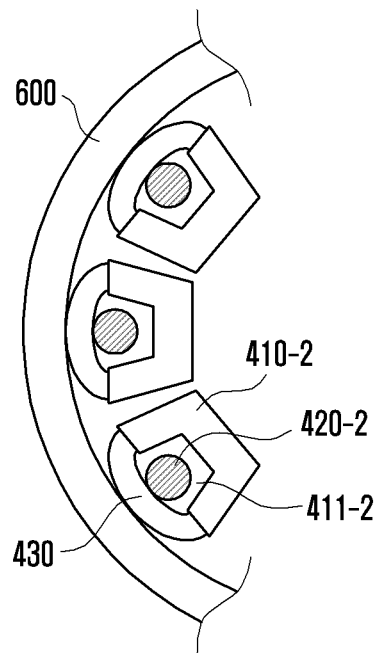

In another example, as shown in FIG. 7B, the moving member 420-2 may have a circular shape. In the flat region ((a) of FIG. 7B), the moving member 420-2 may support the display 600 while being at least in part in close contact with the receiving groove 411-2. In the bending region ((b) of FIG. 7B), the moving member 420-2 may support the display 600 while being spaced apart from the receiving groove 411-2 at least in part.

Figure 7C:
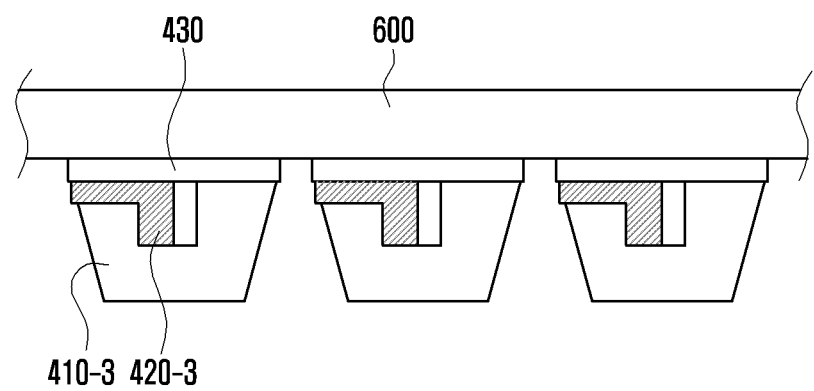
Figure 7C:
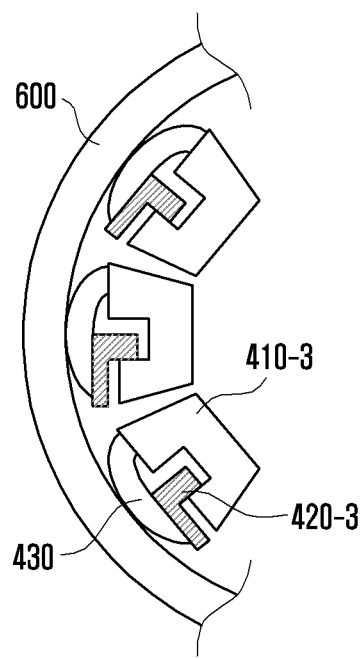

In still another example, as shown in FIG. 7C, the moving member 420-3 may be formed to surround at least in part the base member 410-3. In the flat region ((a) of FIG. 7C), the moving member 420-3 may support the display 600 while being at least in part in close contact with the base member 410-3. In the bending region ((b) of FIG. 7C), the moving member 420-3 may support the display 600 while being spaced apart from the base member 410-3 at least in part.

Figure 7D:
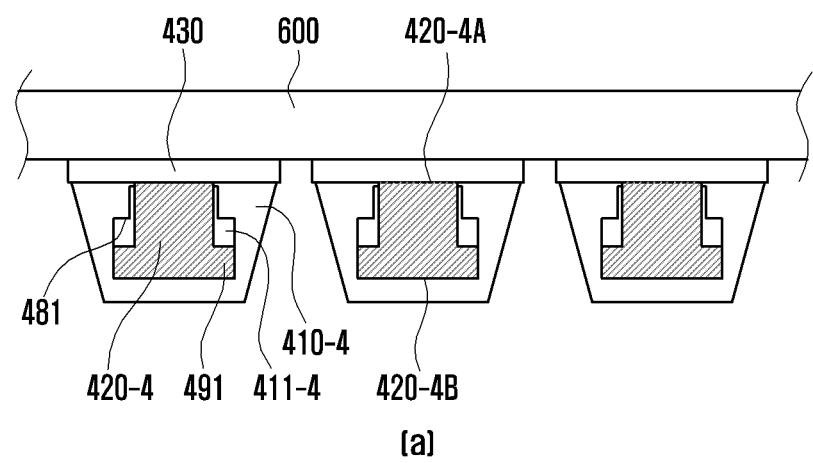
Figure 7D:
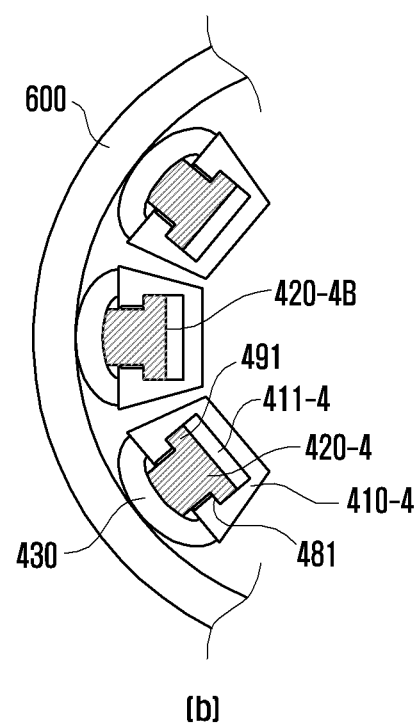

In yet another example, as shown in FIG. 7D, the receiving groove 411-4 of the base member 410-4 may have a locking part 481. The moving member 420-4 may have a protrusion 491 protruding to be caught by the locking part 481 formed in the receiving groove 411-4. In the flat region ((a) of FIG. 7D), the moving member 420-4 may support the display 600 while being at least in part in close contact with the base member 410-4. For example, in FIG. 7D, when a surface of the moving member 420-4 on which the fixing member 430 is disposed is referred to as a front surface 420-4A of the moving member 420-4, and when a surface opposite to the surface on which the fixing member 430 is disposed is referred to as a rear surface 420-4B of the moving member 420-4, the rear surface 420-4B of the moving member 420-4 may be in close contact with the receiving groove 411-4. In the bending region ((b) of FIG. 7D), the moving member 420-4 may support the display 600 while being spaced apart from the receiving groove 411-4 at least in part. For example, in a state that the rear surface 420-4B of the moving member 420-4 is spaced apart from the receiving groove 411-4, the moving member 420-4 may support the display 600. In this case, a separation distance of the moving member 420-4 from the receiving groove 411-4 may be limited to a position where the protrusion 491 is caught by the locking part 481. The separation of the moving member 420-4 from the receiving groove 411-4 may be limited by the locking part 481 and the protrusion 491 caught by the locking part 481.

Figure 7E:
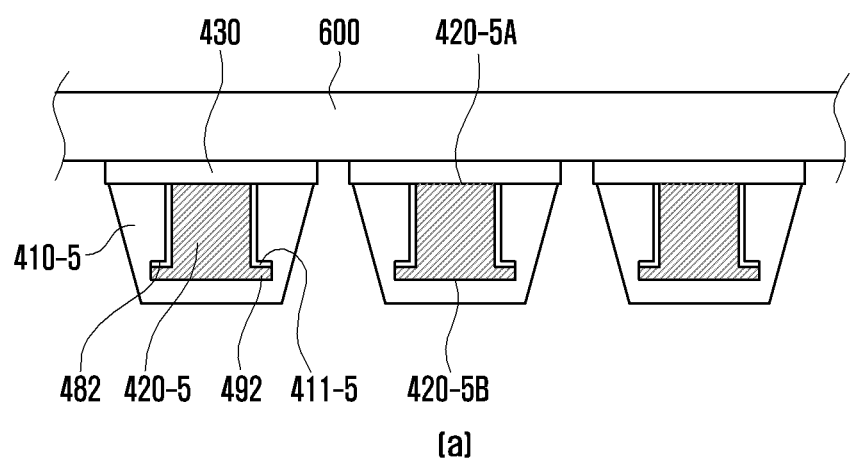
Figure 7E:
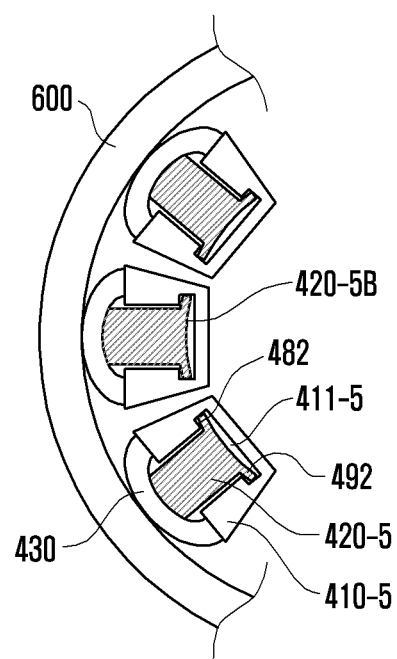

In further another example, as shown in FIG. 7E, the receiving groove 411-5 of the base member 410-5 may have a locking part 482. The moving member 420-5 may have a protrusion 492 protruding to be caught by the locking part 482 formed in the receiving groove 411-5. The protrusion 492 may be formed of an elastic material or have an adjustable thickness to be partially deformed while being caught by the locking part 482. In the flat region ((a) of FIG. 7E), the moving member 420-5 may support the display 600 while being at least in part in close contact with the base member 410-5. For example, in FIG. 7E, when a surface of the moving member 420-5 on which the fixing member 430 is disposed is referred to as a front surface 420-5A of the moving member 420-5, and when a surface opposite to the surface on which the fixing member 430 is disposed is referred to as a rear surface 420-5B of the moving member 420-5, the rear surface 420-5B of the moving member 420-5 may be in close contact with the receiving groove 411-5. In the bending region ((b) of FIG. 7E), the moving member 420-5 may support the display 600 while being spaced apart from the receiving groove 411-5 at least in part. For example, in a state that the rear surface 420-5B of the moving member 420-5 is spaced apart from the receiving groove 411-5, the moving member 420-5 may support the display 600. At this time, the protrusion 492 may be deformed while being caught by the locking part 482. When the base member 410-5 moves from the bending region ((b) of FIG. 7E) to the flat region ((a) of FIG. 7E), the moving member 420 may become in close contact with the receiving groove 411-5 by a restoring force of the deformed protrusion 492-5.

According to certain embodiments of the disclosure, an electronic device may include a first housing, a second housing slidably combined with the first housing, a display fixed at least in part to the second housing and having an visible display area increasing or decreasing in response to a sliding of the second housing, wherein the visible display area is a portion viewed from an outside of the electronic device, and a support structure having a bendable structure, supporting at least a portion of the display, and moving in response to the sliding of the second housing. The support structure may include one or more support members, and a guide rail. Each one of the one or more support members may include a base member extending in a first direction perpendicular to a sliding direction of the second housing and arranged along the sliding direction, and connected to the guide rail, wherein the guide rail guides the movement of the base member, a moving member formed in a shape corresponding at least in part to a receiving groove formed in the base member and inserted at least in part into the receiving groove, a fixing member fixing the base member and the moving member to the display.

In addition, the moving member may be inserted into the receiving groove to be floatable with respect to the base member.

In addition, in a state that at least a portion of the moving member is in contact with the receiving groove of the base member, moving member surfaces formed by the base and moving members are substantially flat.

In addition, the receiving groove of the base member may be closed in the first direction by blocking walls disposed at both ends of the base member, thereby securing the moving member to the base member in the first direction.

In addition, the receiving groove may be inclined toward a center of the base member, and the moving member may be formed in a shape corresponding to the receiving groove.

In addition, the receiving groove may have a locking part, and the moving member may have a protrusion protruding to be caught by the locking part.

In addition, the protrusion of the moving member may be formed of an elastic material, and the elastic material is partially deformed by the locking part.

In addition, the protrusion of the moving member may be partially deformable by the locking part.

In addition, the display may be bendable by, at least in part, the sliding of the second housing with respect to the first housing, and the fixing member may be formed of an adhesive material having an elastic force and be partially deformed in a bending region where the display bends.

In addition, in the bending region, at least a portion of the moving member may be spaced apart from the base member by deformation of the fixing member.

According to certain embodiments of the disclosure, a display support member may include a base member extending in a first direction perpendicular to a sliding direction of a display and arranged along the sliding direction, wherein the base member is connected to a guide rail, and the guide rail guides movement of the base member, a moving member formed in a shape corresponding at least in part to a receiving groove formed in the base member and inserted at least in part into the receiving groove, and a fixing member fixing the base member and the moving member to the display.

In addition, the moving member may be inserted into the receiving groove to be floatable with respect to the base member.

In addition, in a state that at least a portion of the moving member is in contact with the receiving groove of the base member, moving member surfaces formed by the base and moving members are substantially flat.

In addition, the receiving groove of the base member may be closed in the first direction by blocking walls disposed at both ends of the base member, thereby securing the moving member to the base member in the first direction.

In addition, the receiving groove may be formed to be inclined toward a center of the base member, and the moving member may be formed in a shape corresponding to the receiving groove.

In addition, the receiving groove may have a locking part, and the moving member may have a protrusion protruding to be caught by the locking part.

In addition, the protrusion of the moving member may be formed of an elastic material, and the elastic material is partially deformed by the locking part.

In addition, the protrusion of the moving member is partially deformable by the locking part.

In addition, the display is bendable by at least in part by sliding, and the fixing member may be formed of an adhesive material having an elastic force and is partially deformed in a bending region where the display bends.

In addition, in the bending region, at least a portion of the moving member may be spaced apart from the base member by deformation of the fixing member.

The embodiments of the disclosure disclosed in the specification and drawings are merely provided for specific examples in order to easily explain the technical contents according to the embodiments of the disclosure and help the understanding of the embodiments of the disclosure, and are not intended to limit the scope of the embodiments of the disclosure. Therefore, the scope of certain embodiments of the disclosure should be construed to include all changes or modifications derived from the technical ideas of certain embodiments of the disclosure in addition to the embodiments disclosed herein.

The invention claimed is:

1. An electronic device comprising:
a first housing;
a second housing slidably combined with the first housing;
a display fixed at least in part to the second housing and having an visible display area increasing or decreasing in response to a sliding of the second housing, wherein the visible display area is a portion viewed from an outside of the electronic device; and
a support structure having a bendable structure, supporting at least a portion of the display, and moving in response to the sliding of the second housing, the support structure comprising one or more support members, and a guide rail, wherein each one of the one or more the support members include:

a base member extending in a first direction perpendicular to a sliding direction of the second housing and arranged along the sliding direction, and connected to the guide rail, wherein the guide rail guides the movement of the base member;

a moving member inserted at least in part into a receiving groove formed in the base member, and a fixing member fixing the base member and the moving member to the display, wherein the moving member is inserted into the receiving groove to be floatable with respect to the base member.

2. The electronic device of claim 1, wherein in a state that at least a portion of the moving member is in contact with the receiving groove of the base member, support members surfaces formed by the base member and the moving members are substantially flat.

3. The electronic device of claim 1, wherein the receiving groove of the base member is closed in the first direction by blocking walls disposed at both ends of the base member, thereby securing the moving member to the base member in the first direction.

4. The electronic device of claim 1, wherein the receiving groove is inclined toward a center of the base member, and wherein the moving member has a shape corresponding to the receiving groove.

5. The electronic device of claim 1, wherein the receiving groove has a locking part, and wherein the moving member has a protrusion protruding to be caught by the locking part.

6. The electronic device of claim 5, wherein the protrusion of the moving member is formed of an elastic material, and the elastic material is partially deformed by the locking part.

7. The electronic device of claim 5, wherein the protrusion of the moving member is partially deformable by the locking part.

8. The electronic device of claim 1, wherein the display is bendable by, at least in part, the sliding of the second housing with respect to the first housing, and wherein the fixing member comprises an adhesive material having an elastic force and is partially deformed in a bending region where the display bends.

9. The electronic device of claim 8, wherein in the bending region, at least a portion of the moving member is spaced apart from the base member by deformation of the fixing member.

10. An electronic device comprising:

a first housing;

a second housing slidably combined with the first housing;

a display fixed at least in part to the second housing and having a visible display area increasing or decreasing in response to a sliding of the second housing, wherein the visible display area is a portion viewed from an outside of the electronic device, the display having a flat region and a bending region; and a support structure having a bendable structure, supporting at least a portion of the display, and moving in response to the sliding of the second housing, the support structure comprising one or more support members, and a guide rail, wherein each one of the one or more the support members include:

a base member extending in a first direction perpendicular to a sliding direction of the second housing and arranged along the sliding direction, and connected to the guide rail, wherein the guide rail guides the movement of the base member;

a moving member inserted at least in part into a receiving groove formed in the base member, wherein the moving member selectively presses upwards into a fixing member when the base member is in the bending region, and the fixing member fixing the base member and the moving member to the display.

11. The electronic device of claim 10, wherein the moving member is inserted into the receiving groove to be movable with respect to the base member.

12. The electronic device of claim 10, wherein in a state that at least a portion of the moving member is in contact with the receiving groove of the base member, support members surfaces formed by the base member and the moving member are substantially flat.

13. The electronic device of claim 10, wherein the receiving groove of the base member is closed in the first direction by blocking walls disposed at both ends of the base member, thereby securing the moving member to the base member in the first direction.

14. The electronic device of claim 10, wherein the receiving groove is inclined toward a center of the base member, and wherein the moving member is formed in a shape corresponding to the receiving groove.

15. The electronic device of claim 10, wherein the receiving groove has a locking part, and wherein the moving member has a protrusion protruding to be caught by the locking part.

16. The electronic device of claim 15, wherein the protrusion of the moving member is formed of an elastic material, and the elastic material is partially deformed by the locking part.

17. The electronic device of claim 15, wherein the protrusion of the moving member is partially deformable by the locking part.

18. The electronic device of claim 10, wherein the display is bendable by, at least in part, the sliding of the second housing with respect to the first housing, and wherein the fixing member comprises an adhesive material having an elastic force and is partially deformed in the bending region where the display bends.

19. The electronic device of claim 18, wherein in the bending region, at least a portion of the moving member is spaced apart from the base member by deformation of the fixing member.

* * * * *